(12) United States Patent
Gayaka et al.

(10) Patent No.: US 8,780,489 B1
(45) Date of Patent: Jul. 15, 2014

(54) DISK DRIVE ESTIMATING MICROACTUATOR GAIN BY INJECTING A SINUSOID INTO A CLOSED LOOP SERVO SYSTEM

(71) Applicant: Western Digital Technologies, Inc., Irvine, CA (US)

(72) Inventors: Shreekant Gayaka, Sunnyvale, CA (US); Min Chen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/682,673

(22) Filed: Nov. 20, 2012

(51) Int. Cl.
*G11B 5/596* (2006.01)

(52) U.S. Cl.
USPC .................. 360/78.05; 360/78.09; 360/78.14

(58) Field of Classification Search
None
See application file for complete search history.

(56) References Cited

U.S. PATENT DOCUMENTS

| | | | |
|---|---|---|---|
| 5,447,051 A | 9/1995 | Hanks et al. | |
| 5,491,682 A | 2/1996 | Dohmeier et al. | |
| 5,852,524 A | 12/1998 | Glover et al. | |
| 6,088,187 A | 7/2000 | Takaishi | |
| 6,094,973 A | 8/2000 | Novotny | |
| 6,160,676 A | 12/2000 | Takaishi | |
| 6,204,988 B1 | 3/2001 | Codilian et al. | |
| 6,263,251 B1 | 7/2001 | Rutschmann | |
| 6,369,971 B1 | 4/2002 | Everett | |
| 6,510,752 B1 | 1/2003 | Sacks et al. | |
| 6,546,296 B1 | 4/2003 | Hara | |
| 6,563,665 B1 | 5/2003 | Ell | |
| 6,707,633 B2 | 3/2004 | Okuyama et al. | |
| 6,724,563 B2 | 4/2004 | Kobayashi et al. | |
| 6,741,417 B2 | 5/2004 | Hsin et al. | |
| 6,747,837 B1 | 6/2004 | Bennett | |
| 6,861,854 B1 | 3/2005 | Guo et al. | |
| 6,888,694 B2 | 5/2005 | Guo et al. | |
| 6,898,039 B2 | 5/2005 | Kobayashi et al. | |
| 6,956,711 B2 | 10/2005 | Hanson et al. | |
| 6,975,477 B1 | 12/2005 | Hu et al. | |
| 7,019,938 B2 | 3/2006 | Miyata et al. | |
| 7,072,134 B1 | 7/2006 | Hirano et al. | |
| 7,075,748 B2 | 7/2006 | White et al. | |
| 7,079,338 B1 | 7/2006 | Semba et al. | |
| 7,079,339 B1 | 7/2006 | Semba et al. | |

(Continued)

OTHER PUBLICATIONS

M. Kobayshi, S. Nakagawa, H. Numasato, "Adaptive Control of Dual-Stage Actuator for Hard Disk Drives", Proceeding of the 2004 American Control Conference, Boston, Massachusetts Jun. 30-Jul. 2, 2004.

(Continued)

*Primary Examiner* — Andrew L Sniezek

(57) ABSTRACT

A disk drive is disclosed comprising a head, a disk surface, and a dual stage actuator (DSA) servo loop comprising a voice coil motor (VCM) servo loop comprising a VCM and a microactuator servo loop comprising a microactuator operable to actuate the head over the disk surface. A microactuator compensator processes a position error signal (PES) to generate a first control signal, and a disturbance sinusoid is injected into the first control signal to generate a second control signal, wherein the microactuator is controlled in response to the second control signal. Feed-forward compensation is generated corresponding to the injected disturbance sinusoid, and a third control signal is generated in response to the PES and the feed-forward compensation, wherein the VCM is controlled in response to the third control signal. A gain of the microactuator is estimated in response to the feed-forward compensation.

18 Claims, 4 Drawing Sheets

(56) References Cited

U.S. PATENT DOCUMENTS

| | | |
|---|---|---|
| 7,106,552 B2 | 9/2006 | Hirano et al. |
| 7,124,654 B1 | 10/2006 | Davies et al. |
| 7,136,257 B2 | 11/2006 | Zhang et al. |
| 7,265,936 B1 | 9/2007 | Lee et al. |
| 7,283,321 B1 | 10/2007 | Sun et al. |
| 7,342,740 B1 | 3/2008 | Lee et al. |
| 7,385,780 B2 | 6/2008 | Kim et al. |
| 7,392,687 B2 | 7/2008 | Huang et al. |
| 7,423,837 B2 | 9/2008 | Hutsell |
| 7,474,496 B1 | 1/2009 | Sun et al. |
| 7,538,971 B2 | 5/2009 | Sun et al. |
| 7,576,940 B2 | 8/2009 | Lee et al. |
| 7,626,782 B1 | 12/2009 | Yu et al. |
| 7,826,170 B2 | 11/2010 | Semba |
| 7,869,157 B2 | 1/2011 | Nagashima et al. |
| 8,254,222 B1 | 8/2012 | Tang |
| 8,335,049 B1 | 12/2012 | Liu et al. |
| 8,467,144 B2 | 6/2013 | Lim et al. |
| 8,611,040 B1 | 12/2013 | Xi et al. |
| 2001/0036034 A1 | 11/2001 | Chang et al. |
| 2002/0176201 A1 | 11/2002 | Hsin et al. |
| 2003/0030937 A1 | 2/2003 | Kohso et al. |
| 2004/0004781 A1 | 1/2004 | Kobayashi et al. |
| 2004/0228027 A1 | 11/2004 | Zhang et al. |
| 2005/0146807 A1 | 7/2005 | Huang et al. |
| 2007/0223136 A1 | 9/2007 | Hutsell |
| 2008/0129305 A1 | 6/2008 | Perryman et al. |
| 2008/0310046 A1 | 12/2008 | Menegoli et al. |
| 2009/0310250 A1 | 12/2009 | Nagashima et al. |
| 2010/0238588 A1 | 9/2010 | Drouin et al. |
| 2011/0216437 A1 * | 9/2011 | Mathur et al. .................. 360/69 |

OTHER PUBLICATIONS

R. Conway, J. Choi, R. Nagamune, R. Horowitz, "Robust Track-Following Controller Design in Hard Disk Drives Based on Parameter Dependent Lyapunov Functions", IEEE Transactions on Magnetics, vol. 46, No. 4, Apr. 2010.

Y. Kim, S. Chu, S. Kang, "Servo design for high-TPI computer disk drives using a delayaccommodating state estimator," Microsystem technologies, vol. 11, No. 8, pp. 696-701, 2005.

Z. Gao T. Breikin, H. Wang, "Discrete-time proportional and integral observer and observer-based controller for systems with both unknown input and output disturbances," Optimal Control Applications and Methods, vol. 29, No. 3, pp. 171-189, 2008.

M.Krstic, I. Kanellakopolous P.V. Kokotovic, "Nonlinear and Adaptive Control Design", New York: Wiley, 1995, pp. 388-393.

G. Franklin, D. Powell, M. Workman, Digital control dynamic systems, 1997, pp. 56-61.

* cited by examiner

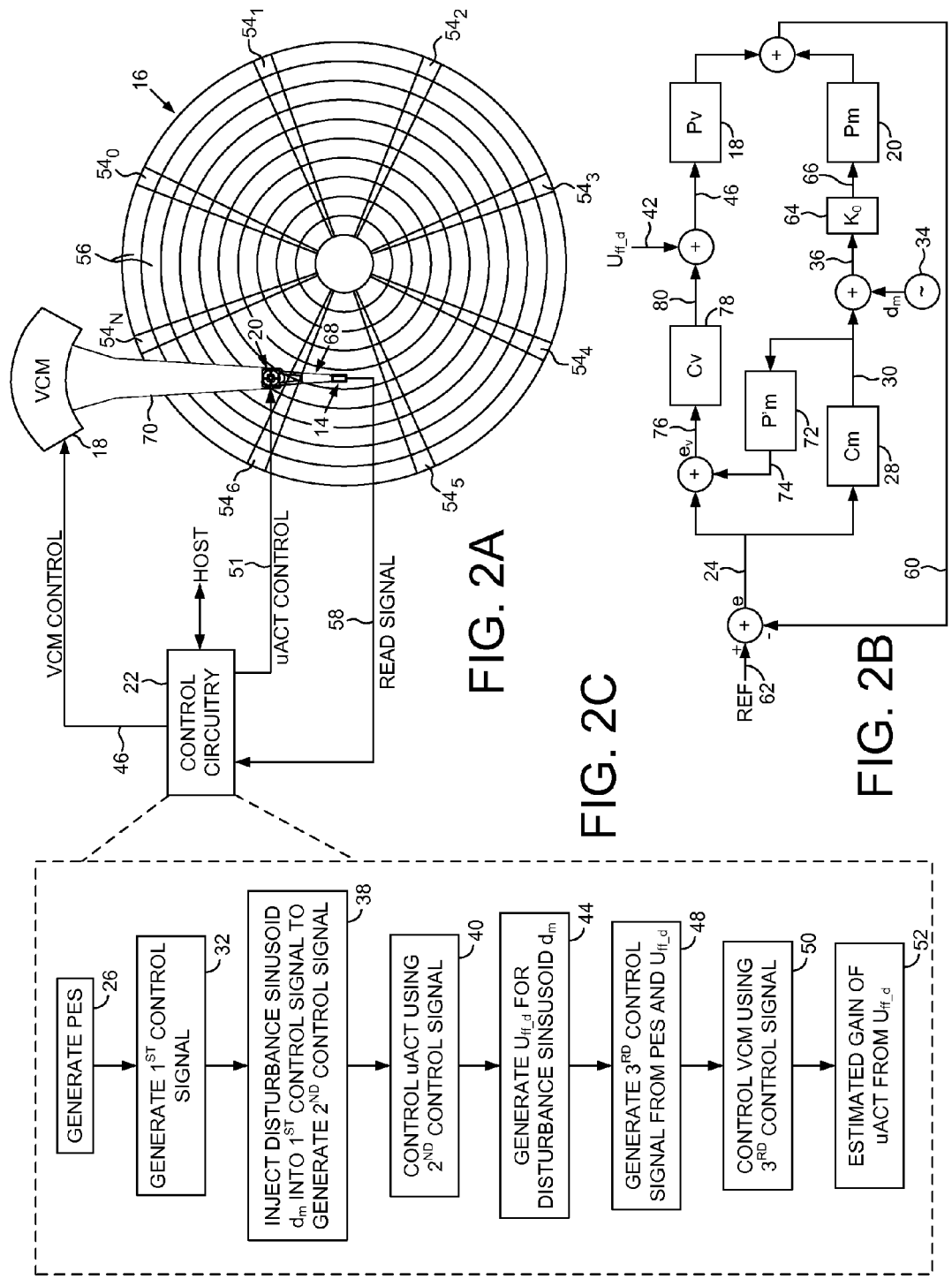

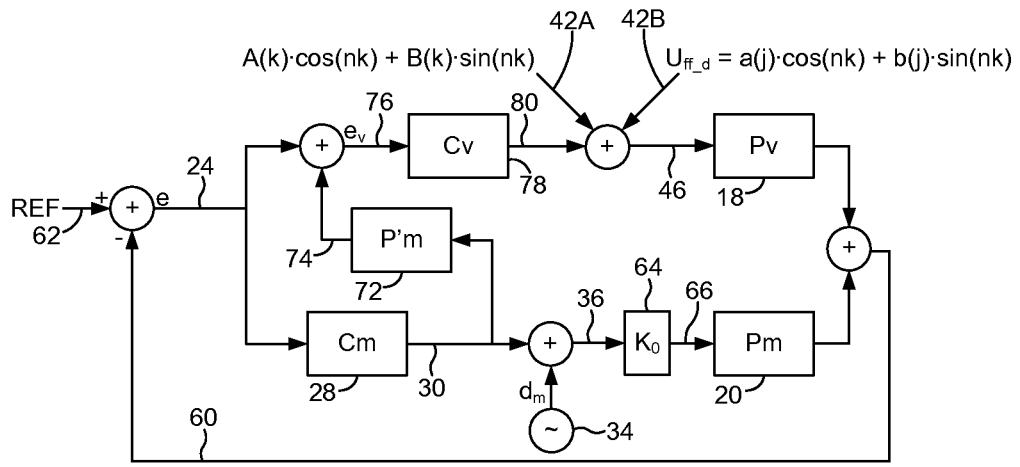
FIG. 3A
$$A(k+1) = A(k) + \mu \cdot PES \cdot \cos(nk)$$
$$B(k+1) = B(k) + \mu \cdot PES \cdot \sin(nk)$$
FIG. 3B
$$a(j+1) = a(j) + \left(\frac{1}{m}\sum_{i=1}^{m} A_i(k)_{\text{post-inj}}\right) - A_{0\text{pre-inj}}$$
$$b(j+1) = b(j) + \left(\frac{1}{m}\sum_{i=1}^{m} B_i(k)_{\text{post-inj}}\right) - B_{0\text{pre-inj}}$$
FIG. 3C
$$Pm(j\omega) \approx \frac{U_{ff\_d} \cdot Pv(j\omega)}{Dm}$$
FIG. 3D
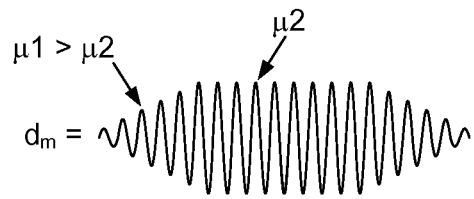
FIG. 3E

DISK DRIVE ESTIMATING MICROACTUATOR GAIN BY INJECTING A SINUSOID INTO A CLOSED LOOP SERVO SYSTEM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

FIG. 1 shows a prior art disk format 1 as comprising a number of servo tracks 3 defined by servo sectors $5_0$-$5_N$ recorded around the circumference of each servo track, wherein a plurality of data tracks are defined relative to the servo tracks. Each servo sector $5_i$ comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector $5_i$ further comprises groups of servo bursts 13, which are recorded with precise intervals and offsets relative to the servo track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

BRIEF DESCRIPTION OF THE DRAWINGS

FIG. 2A shows a disk drive according to an embodiment of the present invention comprising a head actuated over a disk by a dual state actuator (DSA) comprising a voice coil motor (VCM) and a microactuator.

FIG. 2B shows a DSA servo loop comprising a VCM servo loop and a microactuator servo loop according to an embodiment of the present invention.

FIG. 2C is a flow diagram according to an embodiment of the present invention wherein a gain of the microactuator is estimated by injecting a disturbance sinusoid into the microactuator servo loop and evaluating a VCM feed-forward compensation.

FIG. 3A shows an embodiment of the present invention wherein the feed-forward compensation comprises a normal operating component and a post-injection component.

FIG. 3B shows an embodiment for generating the normal operating component of the feed-forward compensation.

FIG. 3C shows an embodiment of the present invention wherein the feed-forward compensation generated for the normal operating component is used to update the post-injection component.

FIG. 3D shows an embodiment of the present invention wherein a frequency response of the microactuator at the frequency of the disturbance sinusoid is estimated based on the post-injection feed-forward compensation, the frequency response of the VCM, and the disturbance sinusoid.

FIG. 3E shows an embodiment of the present invention wherein the sinusoidal disturbance is ramped, and a learning coefficient for learning the feed-forward compensation varies based on the ramping of the disturbance sinusoid.

DETAILED DESCRIPTION

Figure 1:
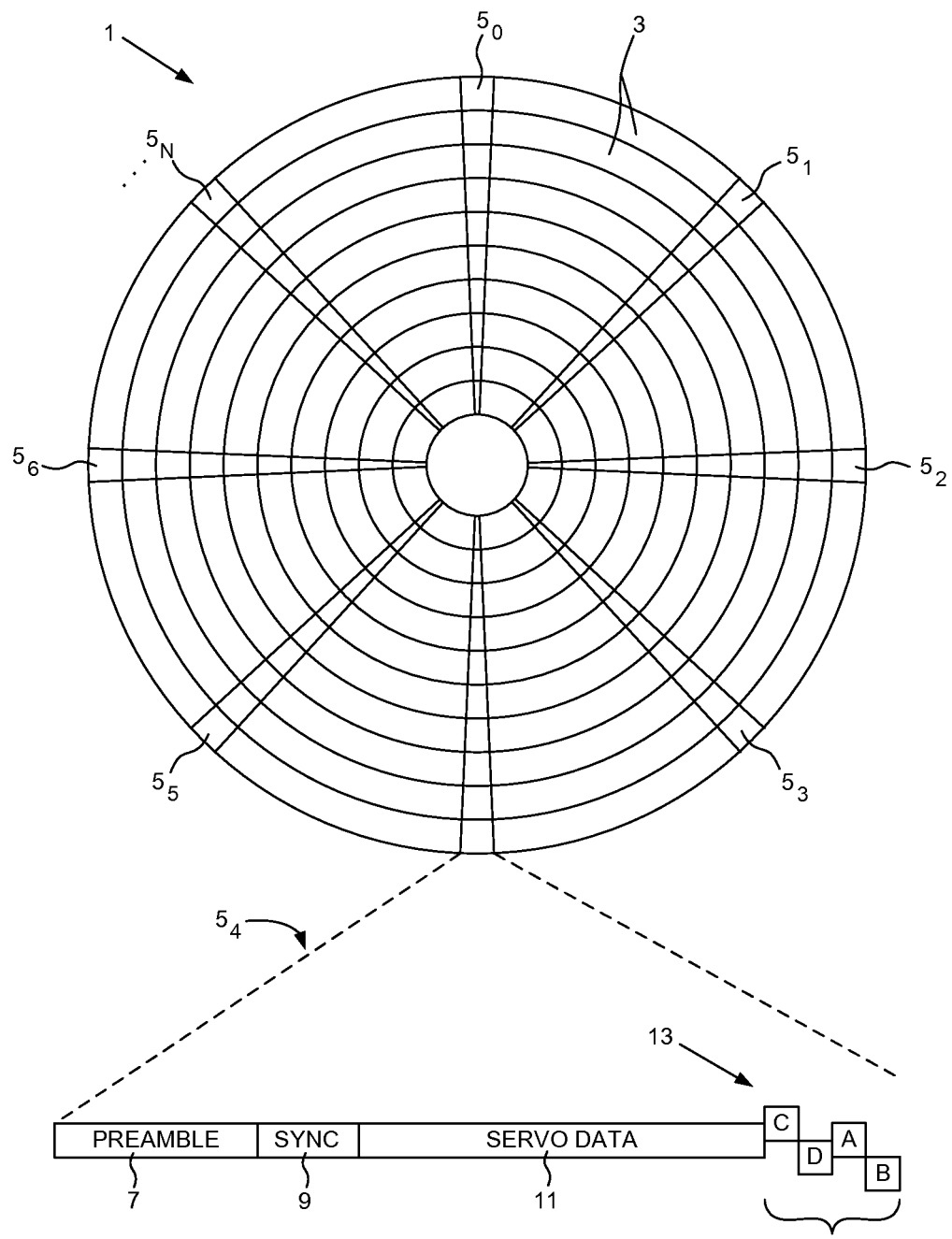
FIG. 1 shows a prior art disk format comprising a plurality of servo tracks defined by servo sectors.

FIG. 2A shows a disk drive according to an embodiment of the present invention comprising a head 14, a disk surface 16, and a dual stage actuator (DSA) servo loop (FIG. 2B) comprising a voice coil motor (VCM) servo loop comprising a VCM 18 and a microactuator servo loop comprising a microactuator 20 operable to actuate the head 14 over the disk surface 16. The disk drive further comprises control circuitry 22 operable to execute the flow diagram of FIG. 2C, wherein a position error signal (PES) 24 is generated representing a position of the head 14 over the disk surface 16 (block 26). The PES 24 is processed using a microactuator compensator 28 to generate a first control signal 30 (block 32). A disturbance sinusoid 34 is injected into the first control signal 30 to generate a second control signal 36 (block 38). The microactuator 20 is controlled in response to the second control signal 36 (block 40), and feed-forward compensation 42 is generated corresponding to the injected disturbance sinusoid 34 (block 44). A third control signal 46 is generated in response to the PES 24 and the feed-forward compensation 42 (block 48), wherein the VCM 18 is controlled in response to the third control signal 46 (block 50). A gain of the microactuator 20 is estimated in response to the feed-forward compensation 42 (block 52).

In the embodiment of FIG. 2A, the disk surface 16 comprises embedded servo sectors $54_0$-$54_N$ that define a plurality of servo tracks 56, wherein data tracks are defined relative to the servo tracks (at the same or different radial density). The control circuitry 22 process a read signal 58 emanating from the head 14 to demodulate the servo sectors $54_0$-$54_N$ into an estimated position 60 (FIG. 2B). The estimated position 60 is subtracted from a reference position 62 to generate the position error signal (PES) 24 representing an error between the actual position of the head and a target position relative to a target track. The PES 24 is filtered by the microactuator compensator 28 to generate the first control signal 30 which is modified by the sinusoidal disturbance 34 to generate the second control signal 36. A gain block 64 amplifies the second control signal 36 to generate a control signal 66 applied to the microactuator 20 which actuates a suspension 68 coupled to a distal end of an actuator arm 70. A model of the microactuator 72 processes the first control signal 30 to generate a control signal 74 that is subtracted from the PES 24 to generate a VCM error signal 76 (i.e., the estimated effect of the first control signal 30 on the microactuator 20 is subtracted from the PES 24 to generate the VCM error signal 76). The VCM error signal 76 is applied to a VCM compensator 78 to generate a control signal 80 that is adjusted by the feed-forward compensation 42 to generate the third control signal 46 applied to the voice coil motor (VCM) 18 which rotates the actuator arm 70 about a pivot.

The servo sectors $54_0$-$54_N$ may comprise any suitable position information, such as a track address for coarse positioning and servo bursts for fine positioning. The servo bursts may also comprise any suitable pattern, such as an amplitude-based servo pattern (e.g., the quadrature servo pattern shown in FIG. 1), or a suitable phase-based servo pattern.

Any suitable microactuator 20 may be employed in the embodiments of the present invention, such as a suitable piezoelectric microactuator. Further, the microactuator 20 may actuate the head 14 over the disk surface 16 in any suitable manner, such as by actuating a suspension 68 relative to the actuator arm 70 as in FIG. 2A, or by actuating a slider relative to the suspension 68. In one embodiment, a nominal frequency response of the microactuator 20 is determined (theoretically or empirically) and used to configure the model of the microactuator 72. However, the gain of the microactuator 20 may deviate from the nominal value over time due, for example, to changes in environmental conditions (e.g., temperature) or general degradation of the microactuator 20. Accordingly, in one embodiment the gain of the microactuator 20 is estimated and in one embodiment adjusted (by adjusting gain block 64), or the gain of the model of the microactuator 72 is adjusted, in order to maintain a target frequency response and overall performance of the DSA servo loop. The gain block 64 may be implemented in any suitable manner, such as an adjustable analog amplifier or a digital amplifier followed by a digital-to-analog converter.

In the embodiments of the present invention, the gain of the microactuator 20 is estimated in response to the feed-forward compensation 42 by injecting the disturbance sinusoid 34 into the microactuator servo loop with the microactuator compensator 28 enabled. The feed-forward compensation 42 cancels the resulting sinusoidal disturbance of the head 14 by actuating the VCM 18 in an opposite sinusoidal direction (to achieve a substantially zero net movement of the head). This may provide a number of benefits, including to maintain stability of the DSA servo loop while executing the microactuator gain estimation procedure. In one embodiment, keeping the microactuator compensator 28 enabled while injecting the disturbance sinusoid 34 may also enable execution of the gain estimation procedure while accessing data tracks during normal operations (e.g., during normal read operations) while still achieving adequate tracking performance. This embodiment may enable execution of the microactuator gain estimation procedure more frequently, as compared to periodically interrupting operation of the disk drive in order to seek to a calibration servo track to execute the microactuator gain estimation procedure.

FIG. 3A shows an embodiment of the present invention wherein the DSA servo loop generates a normal operating feed-forward compensation 42A as well as a post-injection feed-forward compensation 42B. The normal operating feed-forward compensation 42A may compensate for other disturbances in the DSA servo loop, such as repeatable runout (RRO) of the disk surface 16. FIG. 3B shows an equation for generating the normal operating feed-forward compensation 42A by adapting coefficients of a sinusoid based on the PES 24. That is, the coefficients of the sinusoid are adapted so that the resulting feed-forward compensation accounts for the disturbance (e.g., RRO) and thereby reduces the PES 24.

FIG. 3C shows an embodiment of the present invention wherein the post-injection feed-forward compensation is also generated by adapting coefficients of a sinusoid. In this embodiment, the coefficients ($A_0$ and $B_0$) of the normal operating feed-forward compensation 42A are saved prior to injecting the disturbance sinusoid 34. The disturbance sinusoid 34 is then injected into the microactuator servo loop, and the coefficients (a and b) of the post-injection feed-forward compensation 42B are adapted based on the effect the disturbance sinusoid has on the adapted coefficients (A and B) of the normal operating feed-forward compensation 42A. That is, after injecting the disturbance sinusoid 34 the coefficients (A and B) are adapted, and the difference between the adapted coefficients (A and B) and the pre-injection coefficients ($A_0$ and $B_0$) is used to update the coefficients (a and b) of the post-injection feed-forward compensation 42B. In the embodiment of FIG. 3C, the coefficients (A and B) are allowed to adapt over m samples (m servo sectors). The average of the adapted coefficients (A and B) is then used to update the coefficients (a and b) of the post-injection feed-forward compensation 42B (after subtracting the pre-injection coefficients $A_0$ and $B_0$). Accordingly in FIG. 3C the k index represents the samples used to adapt the coefficients (A and B) over the m samples, and the j index represents the update to the coefficients (a and b) after every m samples.

In one embodiment after the coefficients (a and b) of the post-injection feed-forward compensation 42B have adapted sufficiently (e.g., after the PES 24 falls below a threshold), the frequency response of the microactuator 20 (gain and phase) at the frequency of the disturbance sinusoid 34 may be estimated based on the equation shown in FIG. 3D. In FIG. 3D, $U_{ff\_d}$ represents the post-injection feed-forward compensation 42B, $D_m$ represents the disturbance sinusoid 34, and $P_v(j\omega)$ represents a frequency response of the VCM 18 at the frequency of the disturbance sinusoid which may be determined in any suitable manner, such as through a theoretical analysis based on known characteristics of the VCM 18, or based on an empirical analysis of the VCM 18. In one embodiment, the empirical analysis may be performed over a representative sample of the VCMs to derive a nominal frequency response, or the empirical analysis may be performed for each VCM in each individual disk drive (e.g., during a manufacturing procedure).

In the embodiment shown in FIG. 3B, the coefficients (A and B) of the normal operating feed-forward compensation 42A are adapted at a rate that is determined from a learning coefficient μ. In one embodiment illustrated in FIG. 3E, the control circuitry 22 is operable to ramp an amplitude of the disturbance sinusoid 34 toward a maximum amplitude in order to reduce the corresponding transient of the DSA servo loop. The control circuitry 22 may also ramp the amplitude of the disturbance sinusoid back down at the end of the gain estimation procedure as shown in FIG. 3E. In one embodiment, the control circuitry 22 is operable to adapt the coefficients (a and b) of the post-injection feed-forward compensation 42B using a first learning coefficient μ1 while ramping the amplitude of the disturbance sinusoid 34 toward the maximum amplitude (and optionally ramping the amplitude back down). While the amplitude of the disturbance sinusoid is at the maximum amplitude, the control circuitry is operable to adapt the coefficients (a and b) of the post-injection feed-forward compensation 42B using a second learning coefficient μ2 less than the first learning coefficient μ1. That is while ramping the amplitude of the disturbance signal 34, the learning coefficient μ in the equation shown in FIG. 3B is increased so that the coefficients (a and b) of the post-injection feed-forward compensation 42B adapt faster.

Figure 4:
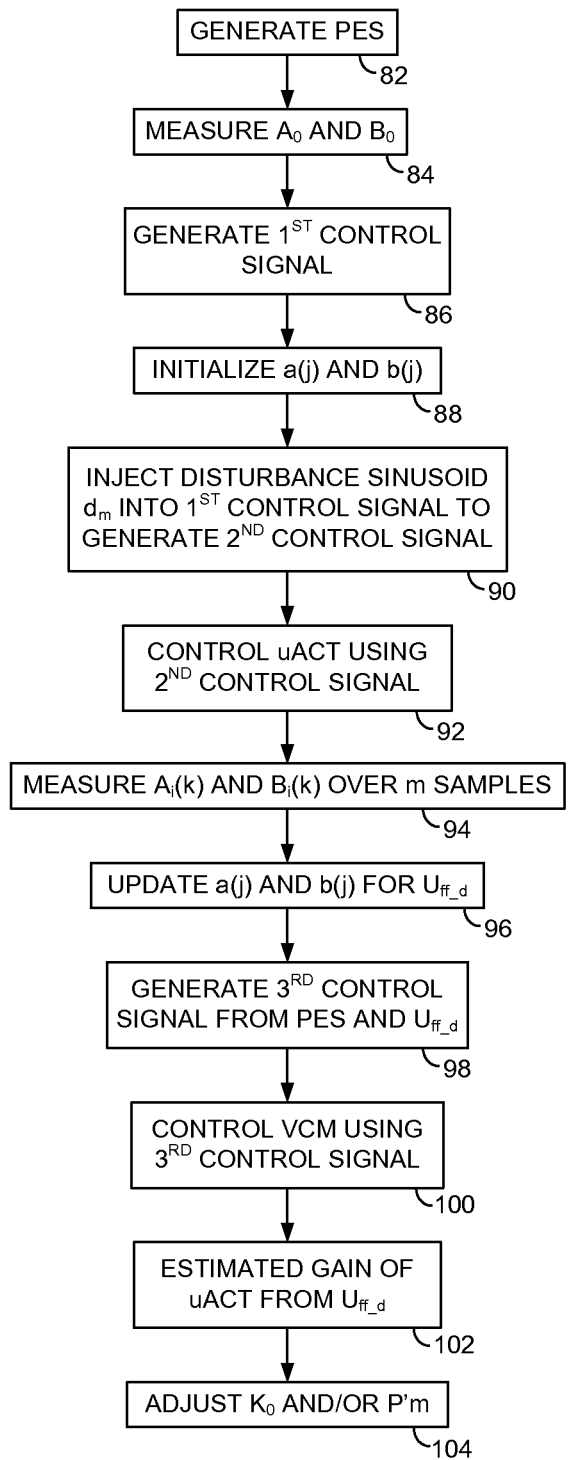
FIG. 4 is a flow diagram according to an embodiment of the present invention wherein at least one of the gain of the microactuator and a gain of a model of the microactuator is updated in response to the estimated gain of the microactuator.

FIG. 4 is a flow diagram according to an embodiment of the present invention wherein prior to injecting the disturbance sinusoid, the PES 24 is measured (block 82) in order to adapt the coefficients (A and B) of the normal operating feed-forward compensation 42A (block 84). The PES 24 is also processed by the microactuator compensator 28 to generate the first control signal 30 (block 86). The coefficients (a and b)

of the post-injection feed-forward compensation 42B are initialized (block 88), such as by initializing the coefficients (a and b) to there previously adapted values during the previous execution of the gain estimation procedure. The disturbance sinusoid 34 is injected into the first control signal 30 to generate the second control signal 36 (block 90), and the microactuator 20 is controlled in response to the second control signal 36 (block 92). The coefficients (A and B) of the normal feed-forward compensation 42A are adapted over m samples (block 94), and then used to update the coefficients (a and b) of the post-injection feed-forward compensation 42B (block 96) as described above with reference to FIG. 3C. The third control signal 46 is generated in response to the PES 24 and the feed-forward compensation values 42A and 42B (block 98), wherein the third control signal 46 is used to control the VCM 18 (block 100). The gain of the microactuator 20 is estimated in response to the post-injection feed-forward compensation 42B (block 102), such as by using the equation described above with reference to FIG. 3D. The estimated gain of the microactuator 20 is then used to adjust at least one of the gain block 64 of the microactuator 20, or the gain of the model of the microactuator 72, thereby maintaining the desired performance of the DSA servo loop.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a head;
a disk surface;
a dual stage actuator (DSA) servo loop comprising a voice coil motor (VCM) servo loop comprising a VCM and a microactuator servo loop comprising a microactuator operable to actuate the head over the disk surface; and
control circuitry operable to:
   generate a position error signal (PES) representing a position of the head over the disk surface;
   process the PES using a microactuator compensator to generate a first control signal;
   inject a disturbance sinusoid into the first control signal to generate a second control signal;
   control the microactuator in response to the second control signal;
   generate first feed-forward compensation corresponding to the injected disturbance sinusoid;
   generate a third control signal in response to the PES and the first feed-forward compensation;
   control the VCM in response to the third control signal; and
   estimate a gain of the microactuator in response to the first feed-forward compensation;
wherein prior to injecting the disturbance sinusoid into the first control signal the control circuitry is further operable to adapt a second feed-forward compensation according to:

$$A(k+1)=A(k)+\mu \cdot PES \cdot \cos(nk)$$

$$B(k+1)=B(k)+\mu \cdot PES \cdot \sin(nk)$$

where:
n represents a frequency of the disturbance sinusoid;
$\mu$ is a learning coefficient; and
A and B are coefficients of a second sinusoid used to generate the second feed-forward compensation; and
after injecting the disturbance sinusoid into the first control signal the control circuitry is further operable to adapt the first feed-forward compensation according to:

$$a(j+1) = a(j) + \left(\frac{1}{m}\sum_{i=1}^{m} A_i(k)_{post-inj}\right) - A_{0pre-inj}$$

$$b(j+1) = b(j) + \left(\frac{1}{m}\sum_{i=1}^{m} B_i(k)_{post-inj}\right) - B_{0pre-inj}$$

where:
a and b are coefficients of a first sinusoid used to generate the first feed-forward compensation;
$A_0$ and $B_0$ are coefficients of the second sinusoid prior to injecting the disturbance sinusoid into the first control signal; and
$A_i$ and $B_i$ are coefficients of the second sinusoid generated over m samples of the PES after injecting the disturbance sinusoid into the first control signal.

2. The disk drive as recited in claim 1, wherein the control circuitry is operable to estimate the gain of the microactuator according to:

$$U_{ff\_d} * P_v(jw)/D_m$$

where:
$U_{ff\_d}$ represents the first feed-forward compensation;
$P_v(j\omega)$ represents a frequency response of the VCM; and
$D_m$ represents the disturbance sinusoid.

3. The disk drive as recited in claim 1, wherein the control circuitry is further operable to ramp an amplitude of the disturbance sinusoid toward a maximum amplitude in order to reduce a corresponding transient of the DSA servo loop.

4. The disk drive as recited in claim 3, wherein the control circuitry is further operable to:
adapt the first feed-forward compensation using a first learning coefficient while ramping the amplitude of the disturbance sinusoid toward the maximum amplitude; and
adapt the first feed-forward compensation using a second learning coefficient after ramping the amplitude of the disturbance sinusoid toward the maximum amplitude, wherein the second learning coefficient is smaller than the first learning coefficient.

5. The disk drive as recited in claim 1, wherein the control circuitry is further operable to adjust the gain of the microactuator in response to the estimated gain of the microactuator.

6. The disk drive as recited in claim 1, wherein the DSA servo loop comprises a model of the microactuator and the control circuitry is further operable to adjust a gain of the model of the microactuator in response to the estimated gain of the microactuator.

7. A method of operating a disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:
   generating a position error signal (PES) representing a position of the head over the disk surface;
   processing the PES using a microactuator compensator to generate a first control signal;
   injecting a disturbance sinusoid into the first control signal to generate a second control signal;
   controlling the microactuator in response to the second control signal;
   generating first feed-forward compensation corresponding to the injected disturbance sinusoid;
   generating a third control signal in response to the PES and the first feed-forward compensation;
   controlling the VCM in response to the third control signal; and
   estimating a gain of the microactuator in response to the first feed-forward compensation;
wherein prior to injecting the disturbance sinusoid into the first control signal the method further comprising adapting the second feed-forward compensation according to:

$$A(k+1)=A(k)+\mu \cdot PES \cdot \cos(nk)$$

$$B(k+1)=B(k)+\mu \cdot PES \cdot \sin(nk)$$

where:
n represents a frequency of the disturbance sinusoid;
$\mu$ is a learning coefficient; and
A and B are coefficients of a second sinusoid used to generate the second feed-forward compensation; and
after injecting the disturbance sinusoid into the first control signal the method further comprising adapting the first feed-forward compensation according to:

$$a(j+1) = a(j) + \left(\frac{1}{m}\sum_{i=1}^{m} A_i(k)_{post-inj}\right) - A_{0pre-inj}$$

$$b(j+1) = b(j) + \left(\frac{1}{m}\sum_{i=1}^{m} B_i(k)_{post-inj}\right) - B_{0pre-inj}$$

where:
a and b are coefficients of a first sinusoid used to generate the first feed-forward compensation;
$A_0$ and $B_0$ are coefficients of the second sinusoid prior to injecting the disturbance sinusoid into the first control signal; and
$A_i$ and $B_i$ are coefficients of the second sinusoid generated over m samples of the PES after injecting the disturbance sinusoid into the first control signal.

8. The method as recited in claim 7, further comprising estimating the gain of the microactuator according to:

$$U_{ff\_d} * P_v(jw)/D_m$$

where:
$U_{ff\_d}$ represents the first feed-forward compensation;
$P_v(j\omega)$ represents a frequency response of the VCM; and
$D_m$ represents the disturbance sinusoid.

9. The method as recited in claim 7, further comprising ramping an amplitude of the disturbance sinusoid toward a maximum amplitude in order to reduce a corresponding transient of the DSA servo loop.

10. The method as recited in claim 9, further comprising:
    adapting the first feed-forward compensation using a first learning coefficient while ramping the amplitude of the disturbance sinusoid toward the maximum amplitude; and
    adapting the first feed-forward compensation using a second learning coefficient after ramping the amplitude of the disturbance sinusoid toward the maximum amplitude, wherein the second learning coefficient is smaller than the first learning coefficient.

11. The method as recited in claim 7, further comprising adjusting the gain of the microactuator in response to the estimated gain of the microactuator.

12. The method as recited in claim 7, wherein the DSA servo loop comprises a model of the microactuator and the method further comprises adjusting a gain of the model of the microactuator in response to the estimated gain of the microactuator.

13. A disk drive comprising:
    a head;
    a disk surface;
    a dual stage actuator (DSA) servo loop comprising a voice coil motor (VCM) servo loop comprising a VCM and a microactuator servo loop comprising a microactuator operable to actuate the head over the disk surface; and
    control circuitry operable to:
      generate a position error signal (PES) representing a position of the head over the disk surface;
      process the PES using a microactuator compensator to generate a first control signal;
      inject a disturbance sinusoid into the first control signal to generate a second control signal;
      control the microactuator in response to the second control signal;
      generate first feed-forward compensation corresponding to the injected disturbance sinusoid;
      generate a third control signal in response to the PES and the first feed-forward compensation;
      control the VCM in response to the third control signal; and
      estimate a gain of the microactuator according to:

$$U_{ff\_d} * P_v(jw)/D_m$$

where:
$U_{ff\_d}$ represents the first feed-forward compensation;
$P_v(j\omega)$ represents a frequency response of the VCM; and
$D_m$ represents the disturbance sinusoid.

14. A disk drive comprising:
    a head;
    a disk surface;
    a dual stage actuator (DSA) servo loop comprising a voice coil motor (VCM) servo loop comprising a VCM and a microactuator servo loop comprising a microactuator operable to actuate the head over the disk surface; and
    control circuitry operable to:
      generate a position error signal (PES) representing a position of the head over the disk surface;
      process the PES using a microactuator compensator to generate a first control signal;

inject a disturbance sinusoid into the first control signal to generate a second control signal;

control the microactuator in response to the second control signal;

generate first feed-forward compensation corresponding to the injected disturbance sinusoid;

generate a third control signal in response to the PES and the first feed-forward compensation;

control the VCM in response to the third control signal;

estimate a gain of the microactuator in response to the first feed-forward compensation; and ramp an amplitude of the disturbance sinusoid toward a maximum amplitude in order to reduce a corresponding transient of the DSA servo loop.

15. The disk drive as recited in claim 14, wherein the control circuitry is further operable to:

adapt the first feed-forward compensation using a first learning coefficient while ramping the amplitude of the disturbance sinusoid toward the maximum amplitude; and adapt the first feed-forward compensation using a second learning coefficient after ramping the amplitude of the disturbance sinusoid toward the maximum amplitude, wherein the second learning coefficient is smaller than the first learning coefficient.

16. A method of operating a disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:

generating a position error signal (PES) representing a position of the head over the disk surface;

processing the PES using a microactuator compensator to generate a first control signal;

injecting a disturbance sinusoid into the first control signal to generate a second control signal;

controlling the microactuator in response to the second control signal;

generating first feed-forward compensation corresponding to the injected disturbance sinusoid;

generating a third control signal in response to the PES and the first feed-forward compensation;

controlling the VCM in response to the third control signal; and estimating the gain of the microactuator according to:

$U_{ff\_d} * P_v(jw)/D_m$ where:

$U_{ff\_d}$ represents the first feed-forward compensation;

$P_v(j\omega)$ represents a frequency response of the VCM; and $D_m$ represents the disturbance sinusoid.

17. A method of operating a disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:

generating a position error signal (PES) representing a position of the head over the disk surface;

processing the PES using a microactuator compensator to generate a first control signal;

injecting a disturbance sinusoid into the first control signal to generate a second control signal;

controlling the microactuator in response to the second control signal;

generating first feed-forward compensation corresponding to the injected disturbance sinusoid;

generating a third control signal in response to the PES and the first feed-forward compensation;

controlling the VCM in response to the third control signal;

estimating a gain of the microactuator in response to the first feed-forward compensation; and ramping an amplitude of the disturbance sinusoid toward a maximum amplitude in order to reduce a corresponding transient of the DSA servo loop.

18. The method as recited in claim 17, further comprising:

adapting the first feed-forward compensation using a first learning coefficient while ramping the amplitude of the disturbance sinusoid toward the maximum amplitude; and adapting the first feed-forward compensation using a second learning coefficient after ramping the amplitude of the disturbance sinusoid toward the maximum amplitude, wherein the second learning coefficient is smaller than the first learning coefficient.

\* \* \* \* \*